(12) United States Patent
Abelite et al.

(10) Patent No.: US 7,478,387 B2
(45) Date of Patent: Jan. 13, 2009

(54) SYSTEM AND METHOD FOR CREATING A RESTARTABLE NON-NATIVE LANGUAGE ROUTINE EXECUTION ENVIRONMENT

(75) Inventors: Margaret A. Abelite, Morgan Hill, CA (US); Curt Lee Cotner, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 10/255,511

(22) Filed: Sep. 25, 2002

(65) Prior Publication Data

US 2004/0060048 A1    Mar. 25, 2004

(51) Int. Cl.
*G06F 9/455* (2006.01)
(52) U.S. Cl. .......................................... 718/1
(58) Field of Classification Search ...................... 718/1
See application file for complete search history.

(56) References Cited

U.S. PATENT DOCUMENTS

| | | | | |
|---|---|---|---|---|
| 5,692,193 | A * | 11/1997 | Jagannathan et al. | 718/106 |
| 5,971,851 | A * | 10/1999 | Pascal et al. | 463/24 |
| 6,587,937 | B1 * | 7/2003 | Jensen et al. | 711/173 |
| 6,591,416 | B1 * | 7/2003 | Bak et al. | 717/148 |
| 6,625,751 | B1 * | 9/2003 | Starovic et al. | 714/11 |
| 6,704,764 | B1 * | 3/2004 | Ottati | 718/1 |
| 6,854,009 | B1 * | 2/2005 | Hughes | 709/220 |
| 6,854,115 | B1 * | 2/2005 | Traversat et al. | 718/1 |
| 7,043,725 | B1 * | 5/2006 | Krishnan et al. | 718/1 |
| 7,080,374 | B2 * | 7/2006 | Dahlstedt et al. | 718/1 |
| 7,213,241 | B2 * | 5/2007 | Cheng | 717/148 |
| 7,325,233 | B2 * | 1/2008 | Kuck et al. | 718/103 |
| 2002/0049963 | A1 * | 4/2002 | Beck et al. | 717/130 |
| 2003/0101440 | A1 * | 5/2003 | Hardin et al. | 717/148 |
| 2003/0167421 | A1 * | 9/2003 | Klemm | 714/37 |
| 2004/0006632 | A1 * | 1/2004 | Cheng | 709/231 |
| 2004/0010787 | A1 * | 1/2004 | Traut et al. | 718/1 |

* cited by examiner

*Primary Examiner*—Andy Ho
(74) *Attorney, Agent, or Firm*—Gates & Cooper LLP

(57) ABSTRACT

A computer program product is provided as a system and associated method to provide a robust, fail-safe, fast environment for running non-native language routine programs, such that when the program fails or terminates, the virtual machine can be restarted without terminating the operating system process. The system dynamically creates a number of independent virtual machines to run non-native language routines. Each virtual machine is created in a process external to the database engine, in a refreshable native runtime environment inside the process or address space. If the virtual machine should terminate with an uncaught exception or error or if it becomes unusable for executing other non-native language routines, the system recognizes that condition and terminates the native runtime environment without terminating the process. When a failed non-native language routine is terminated, the system cleans up any threads related to the termination of the virtual machine, freeing memory allocated to the threads and eliminating any possible conflict between old threads and the next non-native language routine operated by the virtual machine.

20 Claims, 4 Drawing Sheets

SYSTEM AND METHOD FOR CREATING A RESTARTABLE NON-NATIVE LANGUAGE ROUTINE EXECUTION ENVIRONMENT

CROSS-REFERENCE TO RELATED APPLICATION

The present application relates to copending U.S. patent application, Ser. No. 10/255,347, titled "System and Method for Providing Concurrent Usage and Replacement of Non-native Language Routine Codes, " filed on even date herewith, which is assigned to the same assignee as the present application, and which is incorporated herein by reference.

FIELD OF THE INVENTION

The present invention generally relates to database management systems, and particularly to a system and associated computer program device and method for creating a native runtime environment to execute non-native language routines that operate on the information in the database management system. More specifically, this invention provides an assembly language shell that allows the database management system to be independent of the non-native language routine, providing a robust, fail-safe operating environment for non-native language routines that will not cause an outage of the database management system or operating system in the event that the non-native language routine fails.

BACKGROUND OF THE INVENTION

Database systems are collections of files stored on computers or linked systems such as the Internet. The files together contain all the information about a topic or related topics. Generally, a file system is used to "file away" information which a user will later retrieve for processing.

Normally, a file resides in directly accessible storage and can be manipulated as a unit by file system operations. A file system allows a user the means for storing data in files, accessing the data in those files, managing direct access to storage space where the files are stored, and guaranteeing the integrity of those files. Businesses, e-businesses, and other organizations use databases to manage information about clients, orders, client accounts, etc.

Many businesses use databases to organize information and provide the ability to manipulate that information in a variety of ways. These databases are increasingly server-based databases, available for use by both employees and clients through the Internet. Large relational databases are used by companies to manage, for example, information about clients, orders, client accounts, etc and by e-businesses to sell products or access to specialized information over the Internet.

To minimize the network transmission overhead time, the SQL workload performed against the database server should be server-based. These server-based workloads is primarily comprised of invocations of stored procedures and user-defined functions, written either entirely in SQL or in a fully-capable programming language such as C language, COBOL language, or Java®. When such routines are executed, they must perform in a fault-tolerant manner. This ensures that failures of the programs do not affect other database workloads or the execution of subsequent routines; essential availability of the database to clients or employees must not be compromised.

The current popularity of the Java programming language has naturally led to it being used to code database stored procedures and user-defined functions. The client, user, or employee accessing the database writes a user-defined function in Java to access and manipulate the data in the database through the network. This program may access the data many times which is time consuming for the user and resource consuming for the database. If there exist many users accessing the data in the database, the user-defined function may cause contentions against the data in the database.

For a database management system ("DBMS"), to execute such a Java or other non-native language routine, there must be available to the DBMS a Virtual Machine runtime in which to execute this routine. An attribute of such routines is that many types of failures cause the Virtual Machine, to terminate. When the virtual machine terminates, it usually requires the process in which it is running to also terminate in order to start another virtual machine instance; the virtual machine leaves threads and other hooks in the process that must be cleared and initialized.

Some database implementations are designed to allow the virtual machine runtime to execute in a database engine process. Consequently, when the virtual machine terminates, the database engine must be shut down and restarted, causing the database to be unavailable to clients or employees while the database is down. These database outages are costly to the e-business and annoying to clients. Other database implementations have this virtual machine running in an external process. When the virtual machine terminates, a new virtual machine process must be started, causing other implementations of non-native language routines to wait, introducing a possible failure mechanism for those virtual machine processes while they wait.

Thus, there is a need for a robust, fail-safe environment that, upon failure of non-native language routine program, allows the DBMS to execute a new non-native language routine procedure by another user without requiring the DBMS or operating system to shut down and start over. The need for such a system has heretofore remained unsatisfied.

SUMMARY OF THE INVENTION

The present invention presents a system, a computer program product, and an associated method (collectively referred to herein as "the system" or "the present system") for allowing updates to non-native language routines with no outages, satisfy this need. This present system permits a robust, fail-safe, fast environment to run non-native language routine programs, such that when the program fails or terminates, a virtual machine, such as a Java Virtual Machine, or other managed environments, can be restarted without terminating the operation system ("OS") process. The routines operated by the present system can be written, for example, in various languages, including but not limited to: Java, C, Cobol, and so forth.

The present system dynamically creates a number of independent virtual machines to run the non-native language routines. Each virtual machine is created in a process external to the database engine. One feature of the present system is the creation of the virtual machine in a refreshable native runtime environment inside the process or address space.

If the virtual machine should terminate with an uncaught exception or error, or if it becomes unusable for executing other non-native language routines, the present system recognizes this exception state (or condition), and terminates the native runtime environment without terminating the operating system process (OSP) In contrast to the present system, conventional systems require termination of the address space if a non-native language routine fails, necessitating a restart of the operating system. In the present embodiment, it is just the process that needs to be restarted and not the operating system. This is particularly serious if the virtual machine were part of the database address space because of the interruption of the DBMS workload if the process needs to be terminated and restarted.

When the present system terminates a failed non-native language routine or restores a virtual machine that has been rendered useless, it "cleans up" or removes any threads related to the termination of the virtual machine. Cleaning up the threads frees memory allocated to the threads and eliminates possible conflicts between old threads and the next non-native language routine operated by the virtual machine.

The system of the invention re-establishes the native runtime. This approach is significantly faster than creating a new process, as required by currently available systems. Consequently, the present system can create a new non-native language routine runtime much more quickly than current systems, allowing for much higher availability of both the database and the execution environment used to execute the ever-based non-native language routine database programs.

In addition, the present system allows both the task (i.e., thread) and the address space (i.e., process) to remain intact, minimizing outage time, without affecting the workloads of other databases. Uniquely, the present system provides a robust support for e-business database solutions involving applications that wish to exploit server-side non-native language routine inside the database engine.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Abend: (ABnormal END), also called a "crash" or "bomb." It occurs when a computer is presented with instructions or data that it cannot recognize, or when the program has reached a level beyond its protective boundary. It could be the result of erroneous software logic or hardware failure.

Address Space: Actual memory used by a running program. It may refer to physical memory (RAM chips), virtual memory (disk), or a combination of both.

Assembly Language: A programming language that is once removed from a computer's machine language. The assembly language has the same structure and set of commands as a machine language, but it enables a programmer to use names instead of numbers. The assembly language shell is used to launch the virtual machine, and executes a function natively on the computer where a virtual machine exists to execute a non-native language program.

C language: A high-level programming language capable of manipulating the computer at a low level similar to assembly language.

Hooks: Examples of hooks include, but are not limited to signal handlers, event listeners, and asynchronous threads for monitoring the status of the virtual machine.

Internet: A collection of interconnected public and private computer networks that are linked together with routers by a set of standards protocols to form a global, distributed network.

SQL: Structured Query Language, a standardized query language for requesting information from a database.

Thread: A part of a program that can execute independently of other parts.

UDF: User Defined Function. A routine that has been defined or programmed by the user of the system and has been included in a standard library of functions. In these cases, "user" typically means programmer, not end user.

Figure 1:
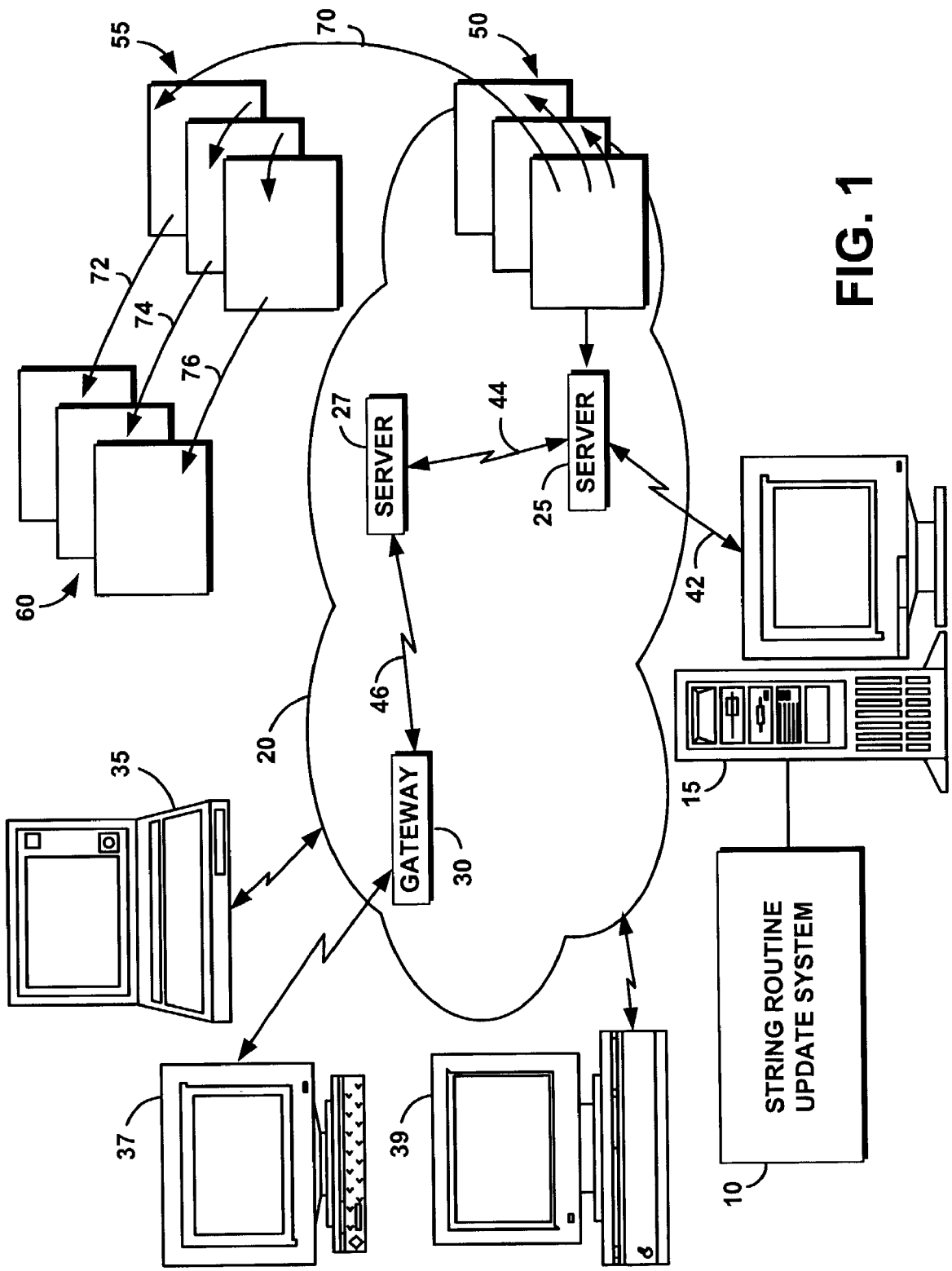
FIG. 1 is a schematic illustration of an exemplary operating environment in which a non-native language routine update system of the present invention can be used.

FIG. 1 portrays the overall environment in which a non-native language routine update system 10 or associated method 260 (FIG. 4) of the present invention may be used. System 10 allows non-native language routines to be updated with no outages. System 10 includes a software programming code or computer program product that is typically embedded within, or installed on a host server 15. Alternatively, system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users, are represented by a variety of computers such as computers 35, 37, 39, and can query the host server 15 for desired information through the communication network 20.

The host server 15 is connected to the network 20 via a communications link 42 such as a telephone, cable, or satellite link. The servers 25, 27 can be connected via high-speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
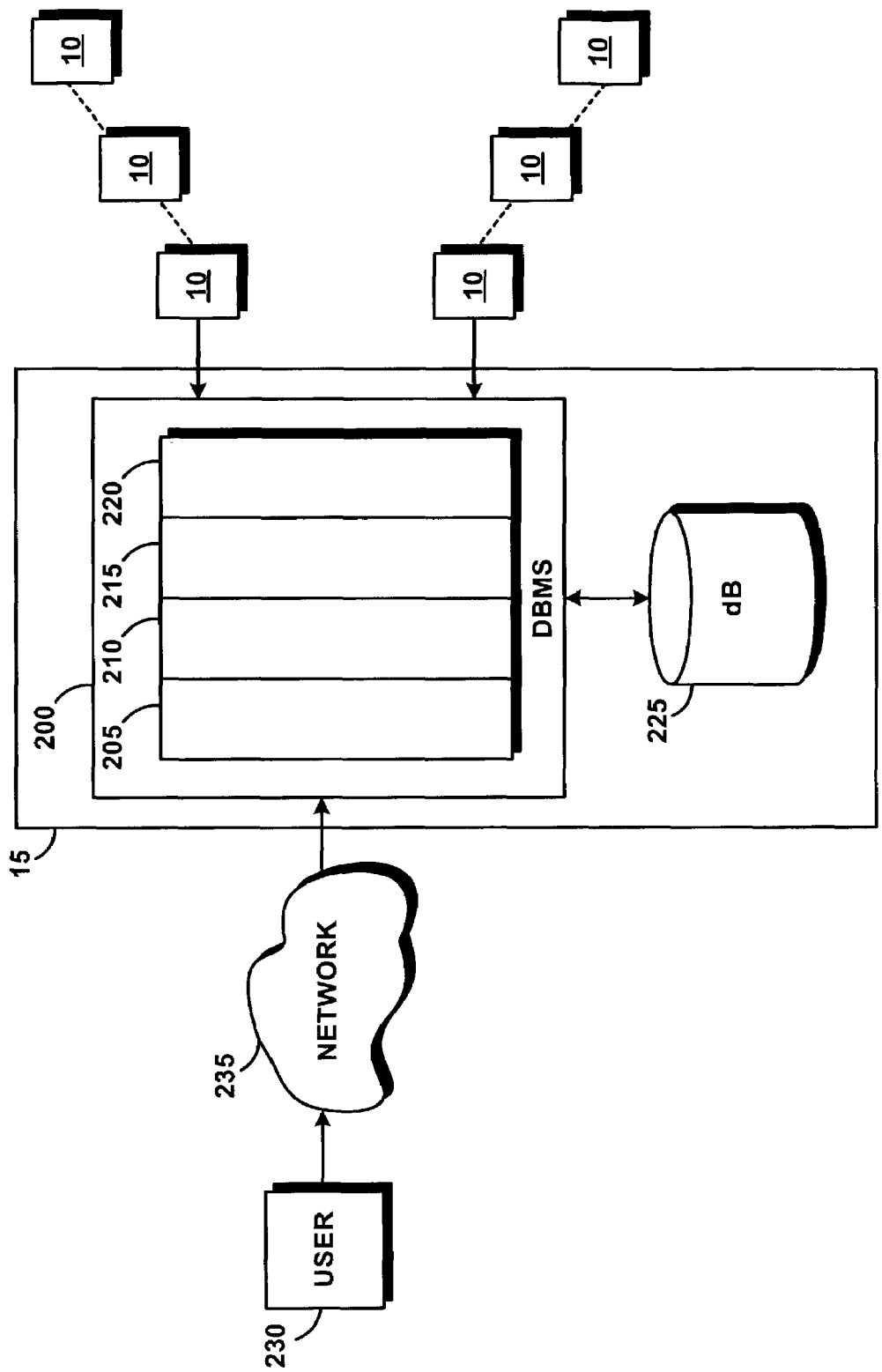
FIG. 2 is a more detailed illustration of an example showing a plurality of non-native language routine update systems of FIG. 1, being used in conjunction with a database management system.

The relationship between system 10 and a DBMS 200 is shown in FIG. 2. The DBMS 200 is typically embedded within, or installed on the host server 15. The DBMS 200 is a relational database with several related and linked files 205, 210, 215, and 220 whose executable code is stored in a database 225.

A user 230 accesses the DBMS 200 through a network 235. The network 235 can be comprised of the Internet, a local area network, or any other form of interconnection between computers. Multiple non-native language routines 10 can be accessed by the DBMS 200 or invoked by the user 230.

Figure 3:
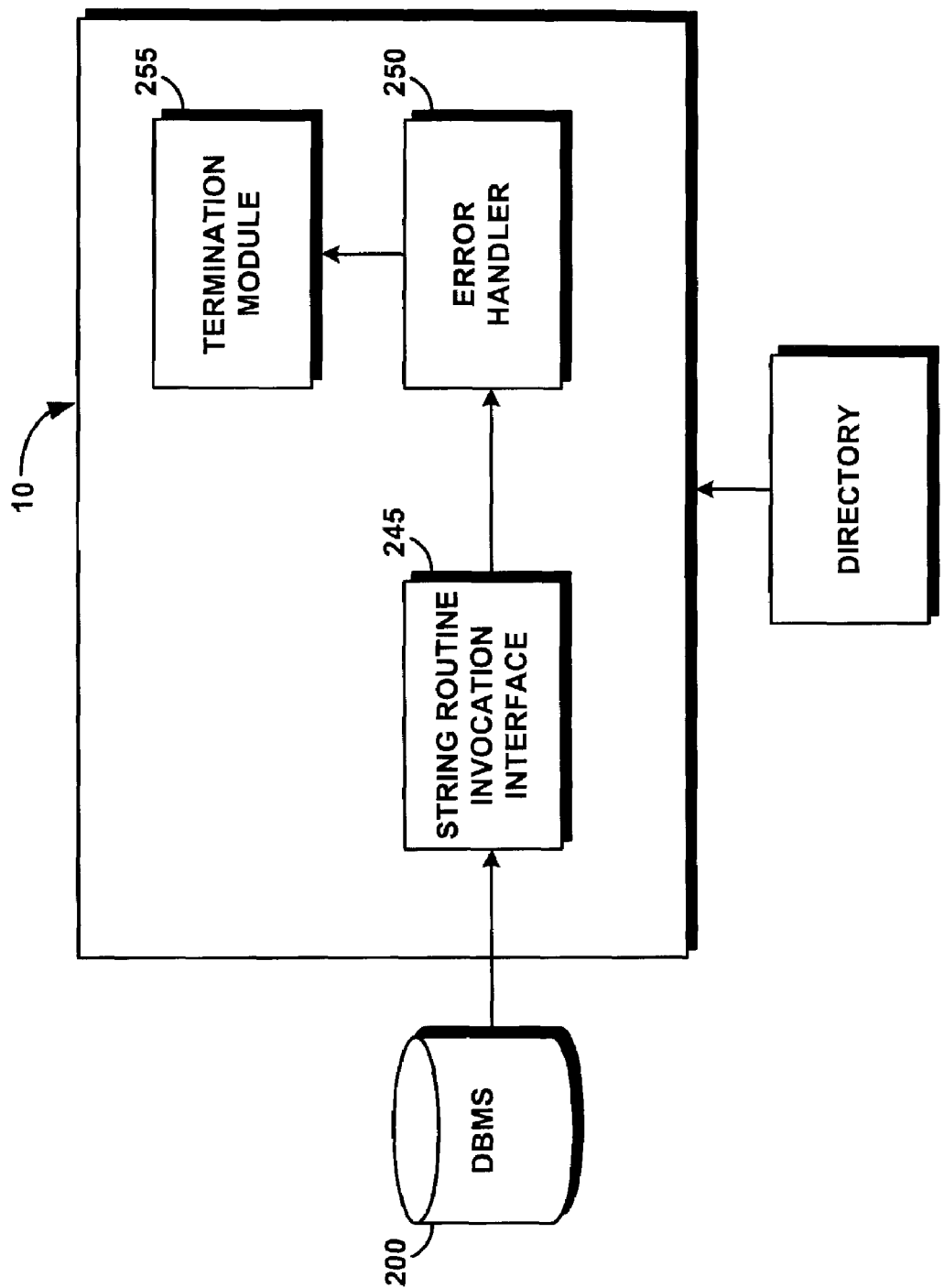
FIG. 3 is a block diagram of the non-native language routine update system of FIGS. 1 and 2.

In operation, and with further reference to the block diagram of FIG. 3, system 10 is generally comprised of a non-native language routine invocation interface 245, an error handler 250, and a termination module 255.

Figure 4:
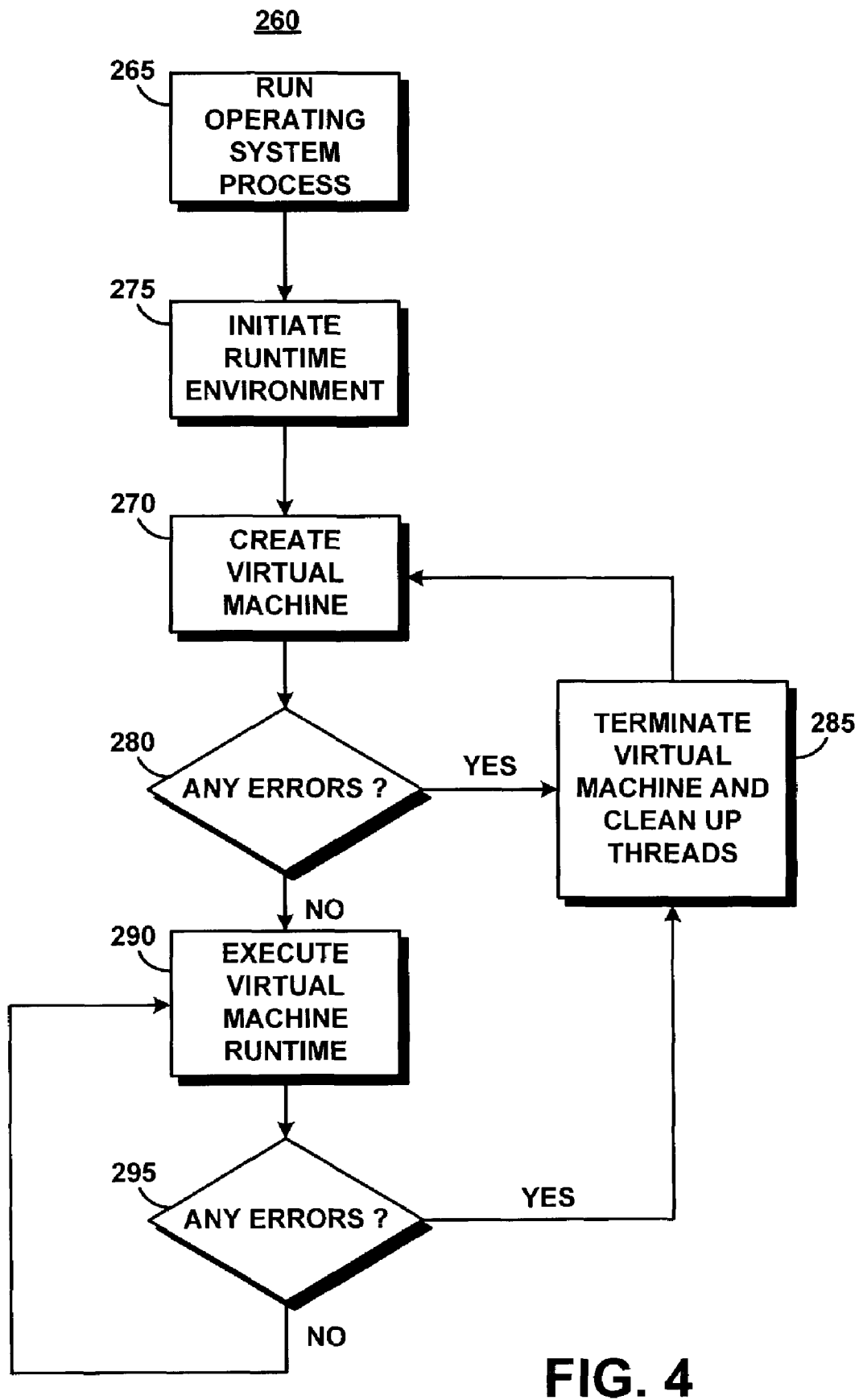
FIG. 4 is a process flow chart illustrating the operation of non-native language routine update system of the previous figures.

With further reference to method 260 of FIG. 4, the operation system process is started either manually or on demand, in step 265, to run routines that are stored in the DBMS in a server address space stored in the DBMS 200 (FIG. 3) and/or user-defined functions (UDFs). Each address space starts a configurable number of tasks (or threads).

In step 270, a launcher program uses the invocation interface 245 to create a virtual machine inside the operating system. During this step, and inside each task, an assembly language "shell" program initializes a common language runtime that will be used to run a desired assembly language (i.e., C language) and non-native language routine programs. Using the assembly language for the shell is an important aspect of system 10 because it allows the shell to be completely independent from the non-native language routine and assembly language runtime.

When the address space has been configured in step 275 to run the non-native language routines, the assembly language program then invokes a C program inside the language runtime that brings up a virtual machine and then returns to the assembly language shell. The assembly language shell then waits for the invocation of a non-native language routine in step 280.

If in step 280, the error handler 250 detects an error condition or a failure that leaves the virtual machine in an unusable state, the termination module 255 terminates the virtual machine in step 285. To terminate the virtual machine, the termination module 255 terminates the language runtime and cleans up any associated threads or other "hooks". This leaves the task and address space intact, but removes all traces of the terminated virtual machine runtime environment. System 10 also triggers an error indication in step 285 and notifies the user of the failure.

The assembly language program then establishes a new language runtime environment in step 270, invokes the launcher program that brings up a replacement virtual machine in step 275, and waits for another non-native language routine to be invoked in step 280. Since the task and address space remained intact through this cleanup/restart activity, system 10 can restart the replacement virtual machine in a relatively short period of time. This aspect of the present system 10 allows the DBMS 200 to continue operating while system 10 handles the termination issues caused by the failure of the previous non-native language routine.

A more catastrophic termination of the virtual machine code (abends or panics) may cause the task or thread to terminate. However, the task is protected by a recovery routine so that the address space or process is not terminated. Therefore, a new task is created and a replacement virtual machine is initialized without the overhead of terminating and restarting the address space.

If no errors are detected by the error handler 250 in step 280, DBMS code uses the invocation interface 245 invokes the non-native language routine in step 290. When a non-native language routine is invoked, the assembly language program invokes another launcher program, which invokes the non-native language routine inside the virtual machine created earlier. As before, the error handler 250 waits for errors to occur during the operation of the non-native language routine or for the virtual machine to be left in an unusable state. If either condition occurs, the error handler 250 initiates the termination process in step 285. As before, the assembly language program then establishes a new language runtime environment in step 270, invokes the launcher program that brings up the replacement virtual machine in step 275 and waits for another non-native language routine to be invoked in step 280.

It is to be understood that the specific embodiments of the invention that have been described are merely illustrative of certain application of the principle of the present invention. Numerous modifications may be made to the system for allowing updates to non-native language routines with no outage invention described herein without departing from the spirit and scope of the present invention.

What is claimed is:

1. A processor implemented method for creating a restartable execution environment, with minimal outage, comprising:
    starting an operating system process including an associated address space;
    creating a virtual machine inside the operating system process, wherein the virtual machine is dedicated to the operating system process;
    checking for an exception state in the virtual machine;
    upon detecting the exception state, automatically terminating the virtual machine, without terminating the operating system process and leaving the associated address space intact; and
    automatically instantiating a new replacement virtual machine within the operating system process using the intact associated address space, upon terminating the virtual machine.

2. The method of claim 1, further comprising terminating any thread associated with the terminated virtual machine, prior to starting the new replacement virtual machine.

3. The method of claim 2, wherein detecting the exception state comprises detecting an error.

4. The method of claim 2, wherein detecting the exception state comprises detecting an unstable state of the virtual machine.

5. The method of claim 2, wherein automatically terminating the virtual machine comprises terminating a native runtime environment without terminating the operating system process.

6. The method of claim 2, wherein creating the virtual machine inside the operating system process comprises an assembly language shell program initializing a common language runtime used to run a non-native language routine program.

7. A computer program product having instruction codes stored on a processor useable medium, for creating a restartable execution environment, with minimal outage to an operating system process including an associated address space, comprising:
    a first set of instruction codes that creates a virtual machine inside the operating system process, wherein the virtual machine is dedicated to the operating system process;
    a second set of instruction codes that checks for an exception state in the virtual machine;
    upon detecting the exception state, the second instruction code automatically terminating the virtual machine, without terminating the operating system process and leaving the associated address space intact; and
    a third set of instruction codes that automatically instantiates a new replacement virtual machine within the operating system process using the intact associated address space, upon terminating the virtual machine.

8. The computer program product of claim 7, wherein the third set of instruction codes further terminates any thread associated with the terminated virtual machine, prior to starting the new replacement virtual machine.

9. The computer program product of claim 8, wherein the exception state comprises an operation error.

10. The computer program product of claim 8, wherein the exception state comprises an unstable state of the virtual machine.

11. The computer program product of claim 8, wherein the third set of instruction codes automatically terminates a native runtime environment without terminating the operating system process.

12. The computer program product of claim 8, wherein the first set of instruction codes comprises an assembly language shell program that initializes a common language runtime used to run a non-native language routine program.

13. The computer program product of claim 8, wherein the first set of instruction codes comprises an invocation interface.

14. A processor implemented system for creating a restartable execution environment, with minimal outage within an operating system process including an associated address space, comprising:
   means for creating a virtual machine inside the operating system process, wherein the virtual machine is dedicated to the operating system process;
   means for checking for an exception state in the virtual machine;
   means for automatically terminating the virtual machine upon detecting the exception state, without terminating the operating system process and leaving the associated address space intact; and
   means for automatically instantiating a new replacement virtual machine within the operating system process using the intact associated address space, upon terminating the virtual machine.

15. The system of claim 14, further comprising means for terminating any thread associated with the terminated virtual machine, prior to starting the new replacement virtual machine.

16. The system of claim 15, wherein the means for automatically terminating the virtual machine upon detecting the exception state, automatically terminates the virtual machine upon detecting an error.

17. The system of claim 15, wherein the means for automatically terminating the virtual machine upon detecting the exception state, automatically terminates the virtual machine upon detecting an unstable state of the virtual machine.

18. The system of claim 15, wherein the means for automatically terminating the virtual machine upon detecting the exception state, automatically terminates the virtual machine upon by terminating a native runtime environment without terminating the operating system process.

19. The system of claim 15, wherein the creating means comprises an assembly language shell program that initializes a common language runtime used to run a non-native language routine program.

20. The system of claim 15, wherein the creating means comprises an invocation interface.

* * * * *